Patented May 3, 1949

2,469,041

UNITED STATES PATENT OFFICE 2,469,041

METHODS FOR PREPARING ALUMINUM SOAPS AND CERTAIN CLASSES OF USEFUL COMPOSITIONS CONTAINING ALUMINUM SOAPS

Norman Lindsay Jones, Brighton, Victoria, Australia, assignor, by mesne assignments, to Standard-Vacuum Oil Company, a corporation of Delaware No Drawing. Application January 10, 1947, Serial No. 721,452. In Australia September 2, 1946

5 Claims. (Cl. 252—35)

This invention relates to processes for the preparation of aluminium soaps from the interaction of aluminium alcoholates and soap forming organic acids, or suitable derivatives of such acids, either under conditions which permit the easy recovery of the soaps or lead to the formation of certain classes of useful compositions containing aluminium soaps.

As is well known aluminium soaps are conventionally formed by the interaction of a water soluble aluminium salt such as the sulphate with a water soluble soap of the appropriate acid or acids, e. g., sodium stearate in an aqueous medium. This process is commonly known as "double decomposition" and has the following disadvantages compared with the process herein described:

1. Tedious and costly washing processes are necessary to remove water-soluble salts formed in the chemical reaction.

2. Recovery and drying of the soap is a troublesome and costly process.

3. The chemical composition of the soaps formed is doubtful and appears to be limited to basic compounds or to soaps contaminated with products of hydrolysis.

We have discovered that the alcoholates formed from aluminium and the lower molecular weight alcohols such as methyl, ethyl, isopropyl and butyl alcohols react readily with the acids normally used for preparing aluminium soaps (e. g., oleic, palmitic, stearic, rosin and napthenic acids) to form pure soaps. Provided water is not present prior to formation of the aluminium soap, it can be made by this means to correspond to the tri-basic compounds which do not appear to be obtained by double decomposition in an aqueous medium with any degree of purity if they are obtained at all. Whilst water may be present in minor molar proportions during soap formation, we have found that more useful products are obtained by forming the aluminium soaps from aluminium alcoholates under anhydrous or substantially anhydrous conditions.

We have found that these alcoholates behave as moderately strong alkalis and unlike aluminium hydroxide are capable of saponifying the glycerides of the fatty acids to form soap at moderate temperatures.

This invention contemplates the application of these basic principles to the preparation of the following useful materials:

1. Aluminium soaps of fatty acids, rosin acids, naphthenic acids or other soap forming organic acids.

2. Fluid solutions of soaps of the types described in (1) above, in organic solvents, suitably in hydrocarbon solvents, such as mineral turpentine, where such solutions are to be used:
(a) As water proofing or impregnating agents for textiles, leather, wood paper or other solid fibrous or porous materials, with or without the addition of other agents; (b) As additives for paints, paint-like compositions solvent thinned metal-corrosion-preventing compositions.

3. For the preparation of lubricating compositions such as fluid oil solutions of aluminium soaps, lubricating oils thickened with aluminium soaps and lubricating greases; and for the preparation of preventives of metallic corrosion allied to such compositions.

For the purposes of this invention the aluminium alcoholates may be prepared by known means and either isolated for subsequent use or prepared in the same general chemical system as that in which the soap forming reaction is carried out.

As an example of the application and methods of carrying out this invention the following illustrations which are not to be taken as restricting its scope, are given:

*Example 1.*—2.8 parts of aluminium butoxide are dissolved in 90 parts of a dry mineral oil of a type conventionally used for manufacturing aluminium greases by usual processes and 9.7 parts of a dry commercial stearic acid of iodine value preferably not greater than 10 is then admixed at a temperature of 130° F. Under these conditions the alcoholate and acids react to form aluminium soap and butyl alcohol, and the latter may be removed as by heating the mixture either under reduced or atmospheric pressure. Removal of the butyl alcohol is not essential but an improvement in rigidity of the final grease is obtained if this is done.

If the composition has been kept free from moisture there will result a fluid solution of approximately 10 percent of aluminium stearate in oil. This composition can be converted to a rigid grease suitably either by allowing it to absorb atmospheric moisture or by introducing about 0.1% of moisture by physical or chemical means.

Thus where a deposit of rigid grease is needed in a locality difficult of access, the fluid oil solution may be introduced and allowed to acquire rigid grease form by absorption of atmospheric moisture.

Alternatively, the fluid oil solution may be converted to a rigid grease by stirring in approximately 0.1% of moisture conveniently in the form of a concentrated water-in-oil emulsion, or dissolved or emulsified in a sulphated or sulphonated oil, as for example by stirring in 0.5% of a sulphated castor oil of 20% water content. While this can be carried out at elevated temperatures, it is an important advantage of this process that hydration to produce a rigid grease can be effected at a temperature sufficiently low to avoid large changes in consistency and structure on cooling to atmospheric temperatures. Consequently it is preferable that the composition be cooled to at least 120° F. before addition of the above water. Grease may be formed in this manner either in the final package, or in a mixing tank in which it may be milled or further compounded in conventional manner.

The time taken for the mixture to set depends to a large degree on temperature but is commonly of the order of ten minutes at room temperature.

The following improvements in aluminium grease manufacture are claimed for this process:

(1) The formation of rigid greases in-situ in parts of machines or the like, which can be more conveniently reached by a fluid oil than by a preformed rigid grease.

(2) The formation of rigid aluminium greases at temperatures sufficiently low to avoid the troublesome effects of cooling rate and stirring on consistency and structure which are characteristic of the conventional processes for preparing such greases wherein an aluminium soap, such as a basic stearate has first to be dispersed at a temperature of the order of 300° F. in a grease-making oil.

(3) The formation of rigid aluminium greases in the final container by introducing a fluid solution of aluminium soap in oil prepared as described above into the container and adding about .1% moisture as in the methods described above, either immediately prior to filling the oil solution into the package and while it is still fluid, or by adding it to the oil solution in the container.

(4) Greases can be readily made by this process having an extreme clarity which is not only attractive, but an indication of a high standard of purity such as cannot easily be obtained if at all when greases are made from aluminium soaps prepared by double decomposition.

*Example 2.*—1.12 parts of aluminium ethoxide are dissolved in 94 parts of a dry grease-making lubricating oil at a temperature of 200° F. and 5.84 parts of dry commercial oleic acid of iodine value preferably not less than 80 are stirred in. Heating is continued either at atmospheric or reduced pressure to substantially remove the ethyl alcohol liberated by the reaction of the ethoxide and acid to form aluminium oleate. The resultant product is a fluid oil solution containing approximately 6.0% of aluminium soap, and useful as a lubricating oil or component of corrosion preventing compositions. It may be converted to a soap thickened oil by the addition of about 0.1% of moisture suitably by methods described in Example 1; the resulting product being very suitable for automobile chassis lubrication or for lubricating bearings of harvester machinery. Likewise a soap thickened oil results if a small amount of water of the above is introduced in or with the oleic acid.

*Example 3.*—A soap thickened oil with valuable lubrication properties is made substantially as in Example 2 above, except that the oleic acid employed therein is replaced by an equivalent amount of naphthenic acid as for example by the use of 5.81 parts of a naphthenic acid of acid value 200. The product may be used as a rock-drill lubricant or other application for which aluminium soap-thickened oils are normally used in lubrication.

It is well known that aluminium soaps are useful additives for paints and like compositions; for solvent thinned corrosion preventives; and for impregnating materials such as leather, textiles, wood and other fibrous or porous materials for the purpose of conferring greater waterproofness or other useful properties. In most instances where aluminium soaps are to be used in such manner it is either necessary or desirable that the aluminium soap be capable of being dissolved in a suitable solvent particularly in petroleum, coal-tar or other fairly volatile hydrocarbons, to give a solution or dispersion with a minimum increase in viscosity. We have observed that this may be achieved if the water content of such solutions or dispersions is extremely small, which frequently means much less than 0.1%. While this can be sometimes realised by known methods such as drying by azeotropic distillation, it can very conveniently be accomplished by preparing such solutions from an aluminium soap made from an alcoholate since the alcoholates may be considered as having been automatically rendered anhydrous during their preparation as any water present during their preparation is converted to aluminium hydroxide which can readily be removed as by filtration from a solution of the alcoholate in a suitable solvent. When an aluminium alcoholate is reacted with an anhydrous soap forming acid and the liberated alcohol removed (suitably by distillation) an anhydrous soap is formed, which may be dissolved or dispersed in many anhydrous organic solvents especially hydrocarbons, to give a thin solution. Even if not removed from the system the liberated alcohols do not appear to always have a deleterious effect on the final product and can often be left in the soap composition depending on the use to which it is to be put.

As an example of the way in which aluminium soap may be prepared in the form of highly fluid solutions or dispersions in suitable organic solvents useful for the purposes enumerated above in accordance with our invention the following example may be given:

*Example 4.*—A solution of 4.9 parts of aluminium butoxide is dissolved in 15 parts of dry mineral turpentine or prepared as follows:

4.4 parts of n-butyl alcohol substantially water-free are dissolved in 150 parts of mineral turpentine and 0.6 part of fine aluminium powder are added and stirred, the process conveniently being carried out in a vessel of non-reactive composition equipped with a reflux condensing system. A solution of mercuric chloride in alcohol is added in very small increments until reaction between the butyl alcohol and aluminium sets in.

Heat is liberated and the mixture may boil. The reaction is continued until the alcohol is virtually all consumed and the solution of aluminium butoxide in mineral turpentine is filtered to free it from metallic residues and aluminium hydroxide formed from any water present in the system. The butoxide solution is analysed to ascertain the exact concentration of aluminium therein and the equivalent quantity of the soap-forming acid, e. g., 17 parts of stearic acid dissolved in 68 parts of warm mineral turpentine is introduced after having first been dehydrated if not already anhydrous. The mixture is heated in a suitable vessel such as a still until the butyl alcohol liberated in the reaction is removed or recovered. The resultant product is a thin solution containing approximately 17.5% of aluminium stearate (or other aluminium soap) which may be used for such purposes as previously described either with or without further adjustment of the quantity of solvent. The incorporation of other materials, as for example, waxes and dyes, which may be useful in the final product in which the soap solution is to be incorporated may often be conveniently carried out at this or an earlier stage of the process.

While the invention is hereinbefore described at some length and with considerable detail, it is to be understood that this is primarily by way of example and that various modifications, refinements and/or additions such as would occur to those versed in the art after reading the specification may be incorporated without departing from the spirit and scope of the invention.

Having now described my invention, what I claim as new and desire to secure by Letters Patent is:

1. A method of preparing an aluminum soap grease which comprises preparing a solution of aluminum alkoxide in a hydrocarbon lubricating oil solvent, adding a higher fatty acid to said solution to convert said aluminum alkoxide to an aluminum soap and release alcohol, cooling to a normal temperature to produce a fluid lubricant, and thereafter adding a small amount of moisture to convert said fluid lubricant to a grease.

2. The method of preparing aluminum soap containing compositions which comprises preparing a solution of a lower aluminum alkoxide in a hydrocarbon lubricating oil solvent, adding sufficient higher fatty acid to completely displace the alcohol in said alkoxide, heating to react said fatty acid with said aluminum alkoxide and to form alcohol, removing said alcohol from the solution to produce a fluid lubricant, and thereafter adding a small amount of moisture to convert said fluid lubricant to a grease.

3. A process of preparing aluminum soap base lubricating greases which comprises dissolving a low molecular weight alcoholate of aluminum in a substantially dry lubricating oil, adding to said solution a sufficient quantity of dry soap forming fatty materials to react with said alcoholate and form alcohol, heating to obtain a substantially complete reaction between said aluminum alcoholate and said fatty material to produce a fluid lubricant, and thereafter adding a small amount of moisture to convert said fluid lubricant to a grease.

4. A process as recited in claim 3 wherein the amount of aluminum soap resulting in the final composition is about 10% by weight of the finished composition.

5. A process as recited in claim 3 wherein the released alcohol is removed by heating and evaporation.

NORMAN LINDSAY JONES.

REFERENCES CITED

The following references are of record in the file of this patent:

UNITED STATES PATENTS

| Number | Name | Date |
| --- | --- | --- |
| 2,225,197 | Stagner | Dec. 17, 1940 |

FOREIGN PATENTS

| Number | Country | Date |
| --- | --- | --- |
| 569,946 | Germany | Feb. 9, 1933 |

OTHER REFERENCES

Porter, Petroleum Dictionary, 3rd edition, page 250, pub. 1930 by the Gulf Pub. Co. of Houston, Tex.